US009550490B2

(12) United States Patent
Guo et al.

(10) Patent No.: US 9,550,490 B2
(45) Date of Patent: Jan. 24, 2017

(54) METHOD OF USING FEEDFORWARD COMPENSATION BASED ON PRESSURE FEEDBACK FOR CONTROLLING SWASH PLATE ANGLE IN A HYDROSTATIC POWER UNIT OF A CONTINUOUSLY VARIABLE TRANSMISSION

(75) Inventors: Haibo Guo, Naperville, IL (US); Peter J. Dix, Naperville, IL (US); Garth H. Bulgrien, Ephrata, PA (US); Brian A. Hartman, Valparaiso, IL (US); Robert C. Prasse, Chicago, IL (US); Cecil A. Weeramantry, Darien, IL (US); Brian E. Felsing, Park Ridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/239,929

(22) PCT Filed: Aug. 27, 2012

(86) PCT No.: PCT/US2012/052560
§ 371 (c)(1),
(2), (4) Date: Feb. 20, 2014

(87) PCT Pub. No.: WO2013/029050
PCT Pub. Date: Feb. 28, 2013

(65) Prior Publication Data
US 2014/0188354 A1    Jul. 3, 2014

Related U.S. Application Data

(60) Provisional application No. 61/527,440, filed on Aug. 25, 2011.

(51) Int. Cl.
*B60W 10/30* (2006.01)
*B60W 10/04* (2006.01)
(Continued)

(52) U.S. Cl.
CPC .............. *B60W 10/30* (2013.01); *B60W 10/04* (2013.01); *F16H 61/431* (2013.01);
(Continued)

(58) Field of Classification Search
None
See application file for complete search history.

(56) References Cited

U.S. PATENT DOCUMENTS 2,097,436 A   11/1937   Bennetch
3,810,531 A    5/1974   Edmunds
(Continued)

OTHER PUBLICATIONS

European Search Report in EP Application No. 12825692.2, Nov. 21, 2016, 5 pages.

*Primary Examiner* — Edwin A Young
*Assistant Examiner* — Timothy M Hannon
(74) *Attorney, Agent, or Firm* — Rickard K. DeMille; Rebecca L. Henkel (57) ABSTRACT

A swash plate angle for a hydrostatic power unit of a continuously variable hydromechanical transmission is determined using a feedforward compensation term, to reduce reliance on closed loop control. The feedforward term is based on knowledge of the hydrostatic power unit determined as a function of knowledge of certain parameters, including, but not limited to, hydrostatic power unit pressure, swash plate angle, desired hydrostatic power unit ratio, and pump speed.

8 Claims, 5 Drawing Sheets

(51) Int. Cl.
*F16H 61/431* (2010.01)
*F16H 61/462* (2010.01)
*F16H 59/68* (2006.01)

(52) U.S. Cl.
CPC ... *F16H 61/462* (2013.01); *F16H 2059/6853* (2013.01); *F16H 2059/6861* (2013.01); *F16H 2059/6869* (2013.01)

(56) References Cited

U.S. PATENT DOCUMENTS

| | | |
|---|---|---|
| 4,055,047 A | 10/1977 | Hara |
| 4,102,222 A | 7/1978 | Miller et al. |
| 4,167,855 A | 9/1979 | Knapp |
| 4,310,078 A | 1/1982 | Shore |
| 4,489,552 A | 12/1984 | Watanabe et al. |
| 4,530,416 A | 7/1985 | Kassai |
| 4,543,786 A | 10/1985 | Shuler |
| 4,653,350 A | 3/1987 | Downs et al. |
| 4,759,185 A | 7/1988 | McConnell et al. |
| 4,811,225 A | 3/1989 | Petzold et al. |
| 5,184,466 A | 2/1993 | Schniederjan et al. |
| 5,406,793 A | 4/1995 | Maruyama et al. |
| 5,449,329 A | 9/1995 | Brandon et al. |
| 5,467,854 A | 11/1995 | Creger et al. |
| 5,468,198 A | 11/1995 | Holbrook et al. |
| 5,531,304 A | 7/1996 | Ishino et al. |
| 5,540,051 A | 7/1996 | Maruyama et al. |
| 5,573,473 A | 11/1996 | Asayama et al. |
| 5,580,332 A | 12/1996 | Mitchell et al. |
| 5,671,137 A | 9/1997 | Ishino et al. |
| 5,684,694 A | 11/1997 | Ishino et al. |
| 5,980,411 A | 11/1999 | Wontner |
| 6,080,074 A | 6/2000 | Ulbrich et al. |
| 6,088,645 A | 7/2000 | Kawasaki et al. |
| 6,115,661 A | 9/2000 | Hosseini et al. |
| 6,164,402 A * | 12/2000 | Hastreiter ............ 180/243 |
| 6,250,077 B1 | 6/2001 | Iino et al. |
| 6,285,942 B1 | 9/2001 | Steinmetz et al. |
| 6,292,732 B1 | 9/2001 | Steinmetz et al. |
| 6,295,497 B1 | 9/2001 | Kuras |
| 6,332,860 B1 | 12/2001 | Hubbard et al. |
| 6,381,529 B1 * | 4/2002 | Mistry .................. 701/51 |
| 6,442,934 B1 | 9/2002 | Okuda et al. |
| 6,481,314 B2 | 11/2002 | Nemoto et al. |
| 6,524,205 B1 | 2/2003 | Irikura et al. |
| 6,616,559 B1 | 9/2003 | Kubota et al. |
| 6,672,990 B2 | 1/2004 | Netzer |
| 6,832,978 B2 | 12/2004 | Buchanan et al. |
| 7,037,236 B2 | 5/2006 | Ishibashi et al. |
| 7,063,638 B2 | 6/2006 | Weeramantry |
| 7,082,757 B2 | 8/2006 | Teslak et al. |
| 7,147,239 B2 | 12/2006 | Teslak et al. |
| 7,278,953 B2 | 10/2007 | Meyer et al. |
| 7,549,287 B2 | 6/2009 | Foster et al. |
| 8,000,863 B2 * | 8/2011 | DeMarco et al. ........... 701/51 |
| 2008/0139363 A1 | 6/2008 | Williams |
| 2008/0242464 A1 | 10/2008 | Kumazaki et al. |
| 2009/0112417 A1 | 4/2009 | Kaminsky et al. |
| 2011/0166752 A1* | 7/2011 | Dix et al. ................ 701/50 |

* cited by examiner

METHOD OF USING FEEDFORWARD COMPENSATION BASED ON PRESSURE FEEDBACK FOR CONTROLLING SWASH PLATE ANGLE IN A HYDROSTATIC POWER UNIT OF A CONTINUOUSLY VARIABLE TRANSMISSION

This application claims the benefit of U.S. Provisional Application No. 61/527,440, filed Aug. 25, 2011.

TECHNICAL FIELD

The present invention relates generally to control of swash plate angle in a hydrostatic power unit of a continuously variable transmission, and more particularly, to a method of swash plate control that utilizes a feedforward compensation term determined as a function of knowledge of certain parameters, including, but not limited to, hydrostatic power unit pressure, swash plate angle, and pump speed, so as to reduce reliance on closed loop control and improve system response.

BACKGROUND ART

The disclosure of U.S. Provisional Application No. 61/527,440, filed Aug. 25, 2011, is hereby incorporated herein in its entirety by reference.

Continuously variable transmissions utilizing a hydrostatic power unit (HSU), hereinafter sometimes referred to as hydro-mechanical continuously variable transmissions, are well known. A variety of work machines utilize this type of transmission for industries such as agriculture, earth moving, construction, forestry, and mining. In operation, the fluid displacement of the hydrostatic power unit is varied to change the output to input ratio of the transmission, that is, the ratio between the rotating output of the transmission, and the input. This is accomplished by varying the angle in a swash plate of a variable displacement fluid pump or motor of the hydrostatic unit. In one category of continuously variable transmissions, the hydrostatic power unit is configured such that at zero vehicle or machine speed, the swash plate of the hydrostatic power unit is at full displacement or near full displacement, in one direction or the other, depending on the range selected, direction of travel and possibly other factors. Reference as an example in this regard, Weeramantry, U.S. Pat. No. 7,063,638 B2, issued Jun. 20, 2006.

Essentially, in operation, the operator commands desired vehicle speed in some manner, for instance, utilizing an input device such as a propulsion handle. This command is received by the transmission controller, and is translated into a desired speed ratio for the transmission, which is defined as the output speed divided by the engine speed, denoted by the term transmission reciprocal ratio or "TRR". Working in the TRR has several advantages. It is more directly related to the ultimate control output (swash plate angle) than the vehicle speed. Also, momentary changes in engine speed don't change the target TRR, and don't affect the swash plate angle, so as to avoid unnecessary changes to the output.

The desired TRR. or "DTRR" is converted into the desired hydrostatic power unit reciprocal ratio or "DHRR", which is defined as the hydrostatic motor speed divided by the pump speed (the hydrostatic reciprocal ratio being referred to herein generally as "HRR"). This is done using knowledge of the layout and gear ratios of the transmission, current speed range, and direction, using equations for the particular transmission. The heart of the controller is closed loop control of HRR. The HRR quantity is chosen since it directly relates to the swash plate angle which is the output of the controller, HRR can be directly calculated from the engine speed sensor and the motor speed sensor, using known gear ratios, Use of HRR is also superior to other methods of control, such as adjusting the swash plate directly for ground speed errors or ratio errors, since it results in the same controller performance in all speed ranges. Typically, the closed control loop for HRR uses a proportional, integral and optionally differential term or "PID".

However, it has been observed that closed loop control can suffer from shortcomings and disadvantages including oscillations and slow response. As an example, a closed loop control will have to determine and apply a different control signal value for controlling the swash plate angle to maintain the motor speed before and after a range shift. Usually, the load on a tractor remains about constant before and after the shift, requiring the same torque, but the relationship between torque and HSU pressure is different in each range, causing a disturbance to the PID loop. As a range shift occurs, the HSU moves from regeneration to non-regeneration, and the pressure changes, causing the disturbance.

Thus, what is sought is a manner of controlling swash plate angle in a hydrostatic power unit of a continuously variable transmission, which overcomes one or more of the disadvantages or shortcomings, and achieving one or more of the desired characteristics, set forth above.

SUMMARY OF THE INVENTION

What is disclosed is a method of controlling swash plate angle in a hydrostatic power unit of a continuously variable transmission which overcomes one or more of the disadvantages or shortcomings, and achieves one or more of the desired characteristics, set forth above.

According to a preferred aspect of the invention, a feedforward compensation term based on the knowledge of the hydrostatic power unit determined as a function of knowledge of certain parameters, including, but not limited to, hydrostatic power unit pressure, swash plate angle, and pump speed, is used in swash plate angle control. As a non-limiting example, the HRR can be used to calculate a feedforward term, including possible use of test data. As another example, a pressure or pressure estimate in combination with HRR may be used to calculate a feedforward term for a two-dimensional lookup table. As another example, pump speed in combination with HRR and perhaps pressure, can be used for a three-dimensional lookup table. As still another example, a pressure estimate can be calculated based on a torque estimate assumed constant during shifting.

This feedforward term is added to the PID terms to reduce reliance on closed loop control, and has been found to improve system response and reduce oscillations. The feedforward term allows the system to avoid wind up of the integral term, since the integrator can be turned off in situations when a large movement in swash plate angle is needed. In this case, the command can move at a relatively constant rate, avoiding the error of the controller building up too high and leading to overshoot of the target. The speed can also be more easily controlled, since the command relates more directly to the DHRR.

As another consideration, with many hydrostatic power units, the current or other value of the control signal required for a specific motor speed will vary as the pressure in the unit changes. If the power flow through the hydrostatic unit changes direction, e.g., power flows from the motor output to the pump shaft, rather than from the pump shaft to the motor output, then the current value required for a specific motor speed can vary quite a bit. For instance, for many transmissions, the power flow will reverse after each range shift.

According to another preferred aspect of the invention, the feedforward term is used to compensate for the disturbance from power reversals. Transmission output torque is calculated, e.g., as a function of pressure of the hydrostatic power unit, HRR and range. An assumption is made that the load will not change much during the shift, which will generally be true if the shift is smooth. The pressure is then estimated based on this load for the oncoming range. This estimated pressure is then used to calculate the feedforward term. Then, this term is applied as a shift is occurring, to move the control signal toward the correct value for the oncoming range. As another aspect of the invention, this method is derived from first principles, so as to be simpler to adjust if the hydrostatic power unit characteristics or other transmission parameters change.

DETAILED DESCRIPTION OF THE INVENTION

Figure 1:
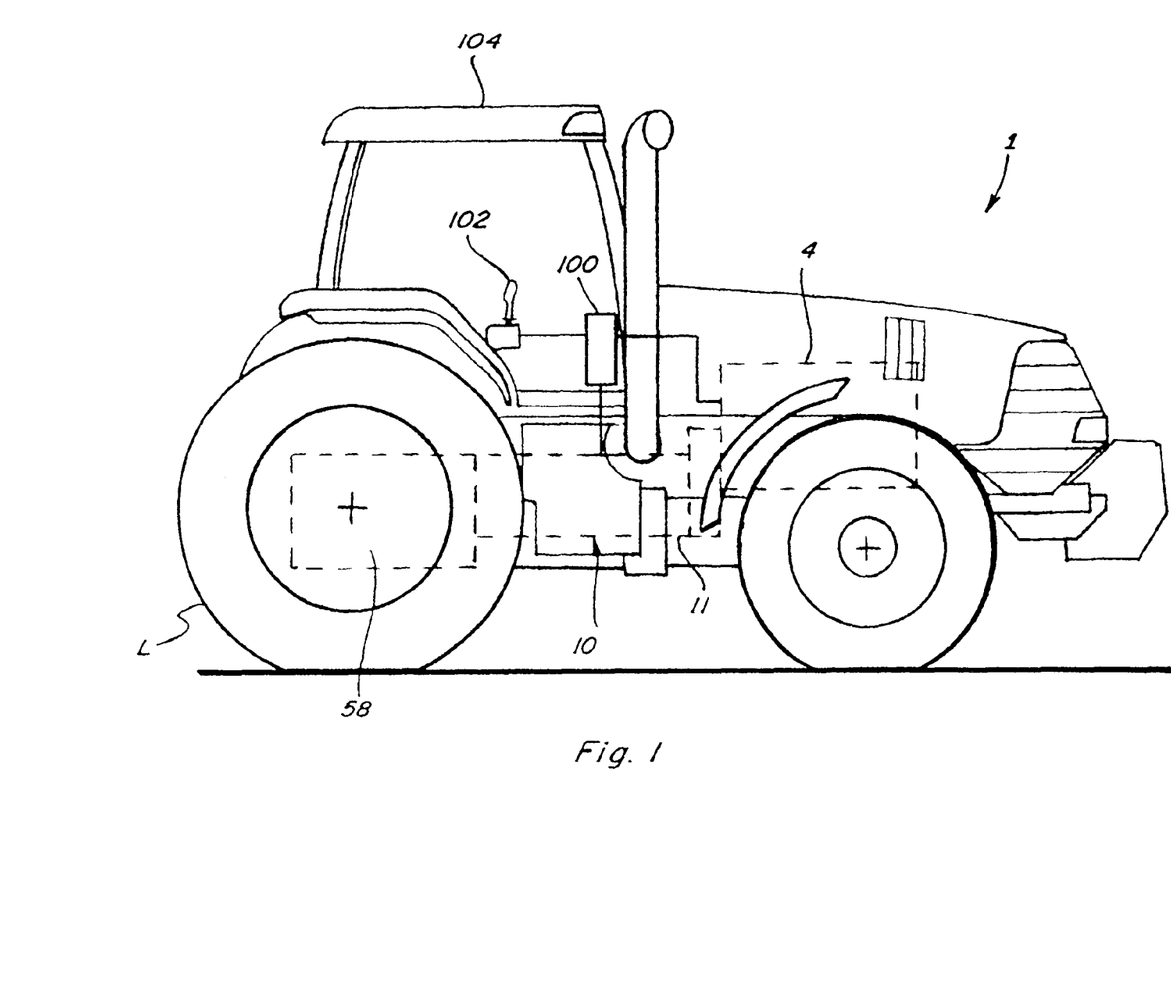
FIG. 1 is a side view of a representative work machine including a continuously variable hydro-mechanical transmission automatically controllable according to the invention for controlling swash plate angle.

Referring now to the drawings, in FIG. 1 a representative vehicle which is a work machine 1 is shown, which is a tractor representative of those that can be used for a variety of uses, including, but not limited to, agriculture, construction, earth moving and forestry. Work machine 1 includes a power source 4 which will be, for instance, an internal combustion engine, and is mechanically coupled to a continuously variable hydro-mechanical transmission, a representative embodiment 10 of which is shown schematically in FIG. 2. Transmission 10 is automatically operable via a method of controlling swash plate angle according to the invention, as will be explained.

Figure 2:
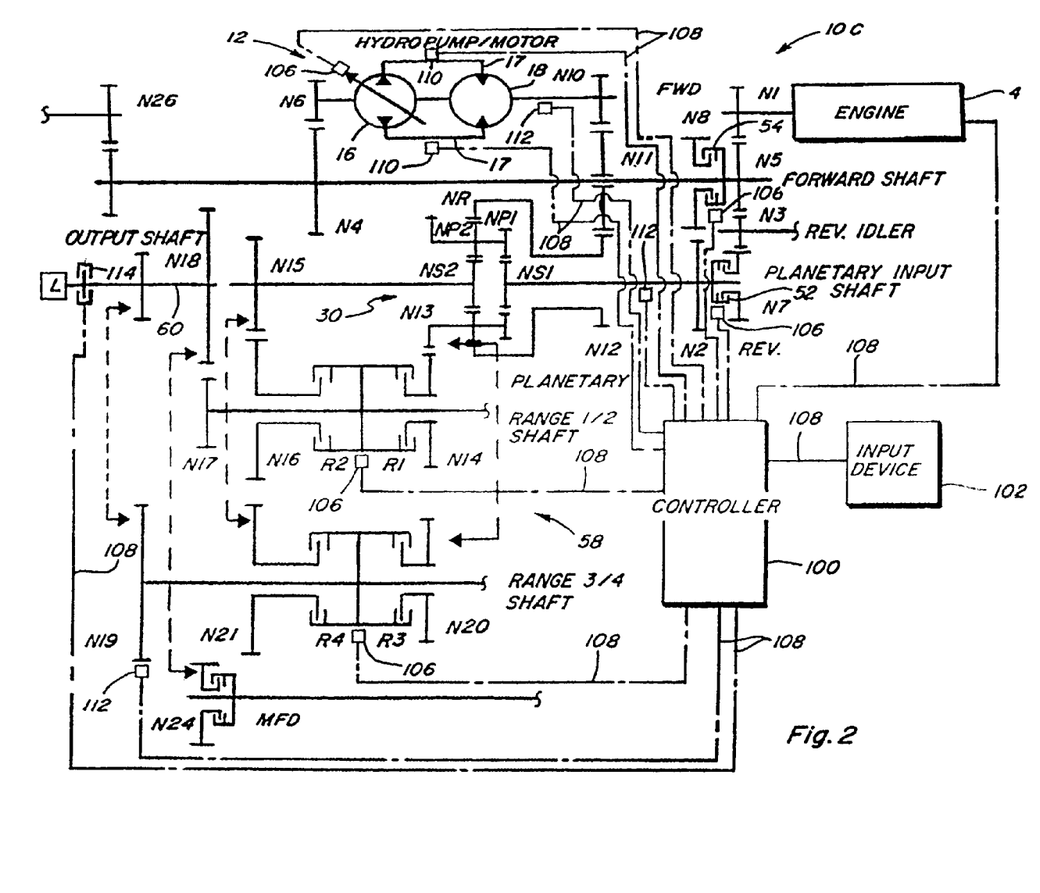
FIG. 2 is a simplified schematic representation of the hydro-mechanical transmission of the work machine of FIG. 1.

Referring also to FIG. 2, transmission 10 is contained in a transmission housing 11 and includes a hydrostatic power unit 12 and a planetary power unit 30 which are coupled to a driveline including a range gear set 58 mounted within transmission housing 11 and coupled to a load L which here is the drive wheels of machine 1 as shown in FIG. 1. It should be understood that machine 1 can alternatively include a load L that comprises a track drive, or an operating system of the machine such as but not limited to, a power take off (PTO).

Hydrostatic power unit 12 of transmission 10 includes a fluid pump 16 coupled by fluid conduits 17 in a closed loop to a fluid motor 18. Motor 18 is coupled to power source 4 via an input gear N6 and having an output gear N10. The power to the hydrostatic power unit 12 is provided by a driven gear N4 mounted on the forward shaft and engaged with gear N6. Output gear N10 is connected to ring gear NR of planetary power unit 30 via gears N11 and N12.

Machine 1 includes a processor based controller 100 in connection with an input device 102 located preferably in operator cab 104 of machine 1, via a suitable communications path 108, to adjust the angle of a swash plate of pump 16, denoted by the term "SPA", for controlling operation of the transmission. As an exemplary embodiment, pump 16 can be an electronically controlled variable displacement hydraulic pump of well known construction.

Planetary power unit 30 includes a primary sun gear NS1 on a planetary input shaft 32 connectable with power source 4 via a forward directional clutch 54 or a reverse directional clutch 52. Power unit 30 is selectively coupled to the load L, coupled to the hydrostatic power unit 12 and selectively coupled to the power source 4, under automatic control of controller 100. For connection to the load L, the hydromechanical transmission 10 includes an output shaft 60 coupled to the load L which carries an input gear N18 engaged with an output gear N17 on a range 1/2 shaft of range gear set 58, and a gear N22 engaged with a gear N19 on a range 3/4 shaft. The range 1/2 shaft can be coupled to planetary power unit 30 via automatic operation of range selectors or clutches R1 and R2 for power flow through gears N13 and N14, or N15 and N16, respectively. The range 3/4 shaft can be coupled to unit 30 via range selectors or clutches R3 and R4 for power flow via gears N13 and N20, or N15 and N21. Range 1/2 shaft and range 3/4 shaft can also be simultaneously coupled to power unit 30, to provide dual power flow.

The control of the various clutches will be automatically controlled by controller 100, using actuators 106 connected to controller 100 via suitable conductive paths 108. Transmission 10 also includes appropriate sensors, including pressure sensors 110 for sensing pressure conditions in conduits 17 connecting pump 16 and motor 18, and speed sensors 112 for sensing speeds of load shaft 60, all connected to controller 100 via conductive paths 108. Controller 100 is also connected to engine 4 for receiving speed and other information therefrom.

In operation, the continuously variable hydro-mechanical transmission 10 can be operated to have a combined hydrostatic and mechanical power flow by engaging the reverse clutch 52 to power planetary power unit 30 via gears N1, N3, N5 and N7, or engaging forward clutch 54 to power it via gears N1, N8, and N2. It is also possible to operate transmission 10 for a pure hydrostatic power flow by disengaging both clutches 52 and 54, and engaging two range clutches. Typically, the R1 and R2 range clutches, and the R1 and R4 clutches.

As a result, with transmission 10, there is no selection for a work range or road range per se. However, the transmission provides a seamless transition between ranges to provide work/road configurations as desired. Speed change from zero to maximum speed is achieved in a smooth and continuous manner by changing the SPA of the pump 16 under control of controller 100. For each speed range, substantially the full range of travel of the swash plate is used. That is, the swash plate will be at one end of the range its travel for minimum speed within the range, it will be at the other end for maximum speed in that range, and the zero tilt or neutral position of the swash plate will be an intermediate position for the speed range, not the zero speed position as it is for some other transmissions. This presents a challenge for execution of some transmission commands that require a change of state wherein the swash plate will have to be tilted to a position significantly different from the present position. And, the direction of power flow through the hydrostatic power unit will often reverse during these range changes.

Transmission 10 includes a parking brake 114 in connection with load shaft 60 (or the MFD shaft), which is utilized according to the invention for enabling shuttle shifts and other operations. Parking brake 114 is connected to controller 100 via a suitable conductive path 108 for automatic operative control thereby, including to proportionally or gradually engage, and release or disengage, under certain conditions. To achieve this latter capability, as a non-limiting example, parking brake 114 can be controlled using a proportional pressure reducing valve operated by an electrical signal from controller 100. For operation when machine 1 is not operating, parking brake 114 can be engaged by a spring or other biasing element or elements, or by mechanical means.

Other conditions wherein parking brake 114 will be automatically controlled by controller 100 to engage, or remain engaged if already engaged, can include, but are not limited to, when power source 4 of machine 1 is turned off, the transmission is disengaged, the operator leaves the operator seat, and a time out condition wherein the operator leaves the FNR lever in F for a period of time without movement. Controller 100 will also control the parking brake to remain engaged when a command is received to disengage the parking brake, until certain conditions are met, as will be explained. Other conditions include when a command is received via an input device 102, e.g., FNR lever or the like, to change the operating state of the transmission. Such commands can include a change to, or in close proximity to, a neutral or zero movement state, or a clutch command.

Figure 3:
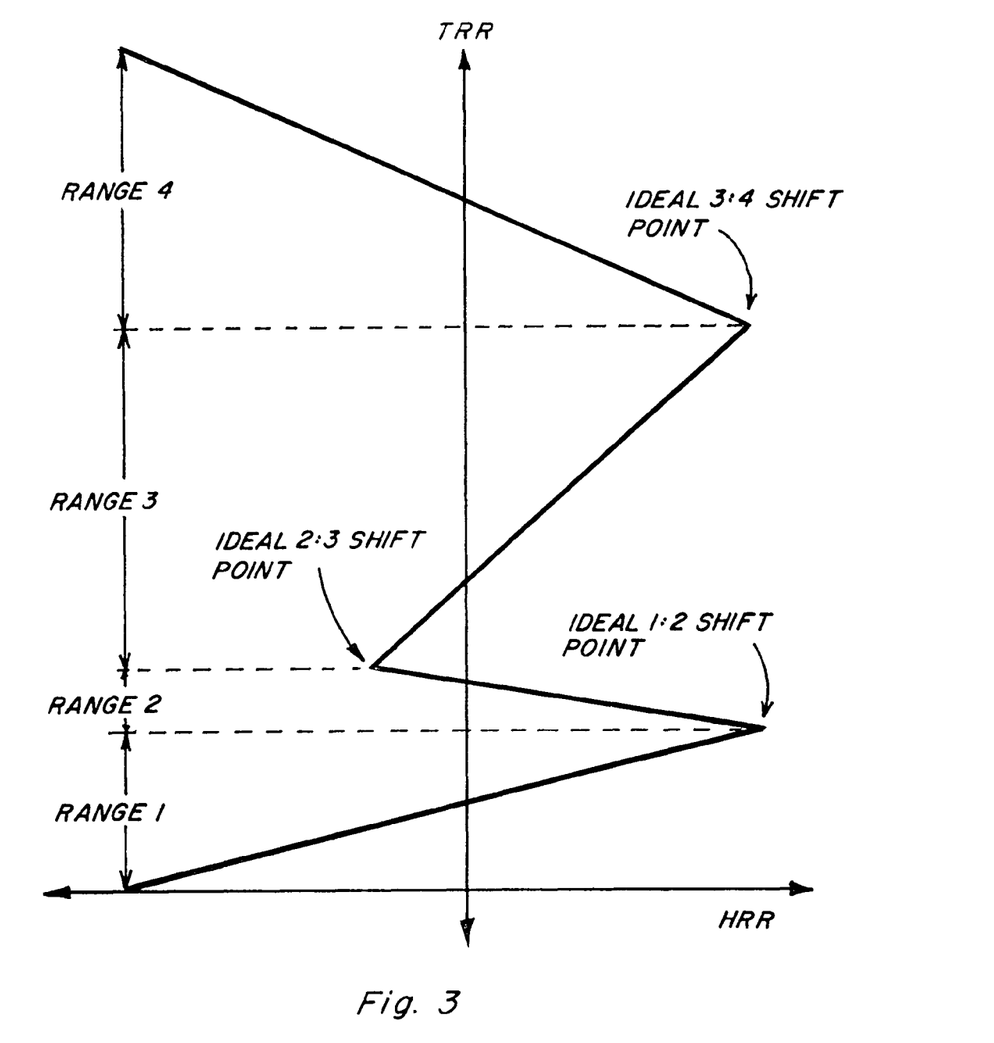
FIG. 3 is a simplified diagrammatic representation of transmission ratio verses hydrostatic power unit ratio for the transmission of FIG. 2.

Referring also to FIG. 3, a graphical representation of the relationship of transmission ratio TRR, to hydrostatic power unit ratio (motor speed/pump speed) HRR, is shown, for the four selectable forward ranges: namely, forward range 1 or low; forward range 2; forward range 3; and forward range 4. HRR directly relates to swash plate angle, which is the parameter controlled by controller 100 according to the invention as will be explained. In FIG. 3, it should be noted that for each of the ranges, the zero tilt position of the swash plate lies between the maximum degrees of tilt in the opposite directions of movement of the swash plate. Thus, at the lowest hydrostatic power unit ratio for forward range 1, the swash plate will be near maximum tilt in the left hand direction as depicted, which is also the zero speed ratio for the transmission for that direction, while at the highest ratio for that range the swash plate will be near its maximum tilt in the opposite direction, which is the right hand direction as depicted. It can be noted that for the reverse direction, the opposite is true. Thus, it can also be understood that to go from zero speed in the lowest range in the forward direction to zero speed in the lowest range in the reverse direction, the swash plate must travel substantially its entire range of movement.

Figure 4:
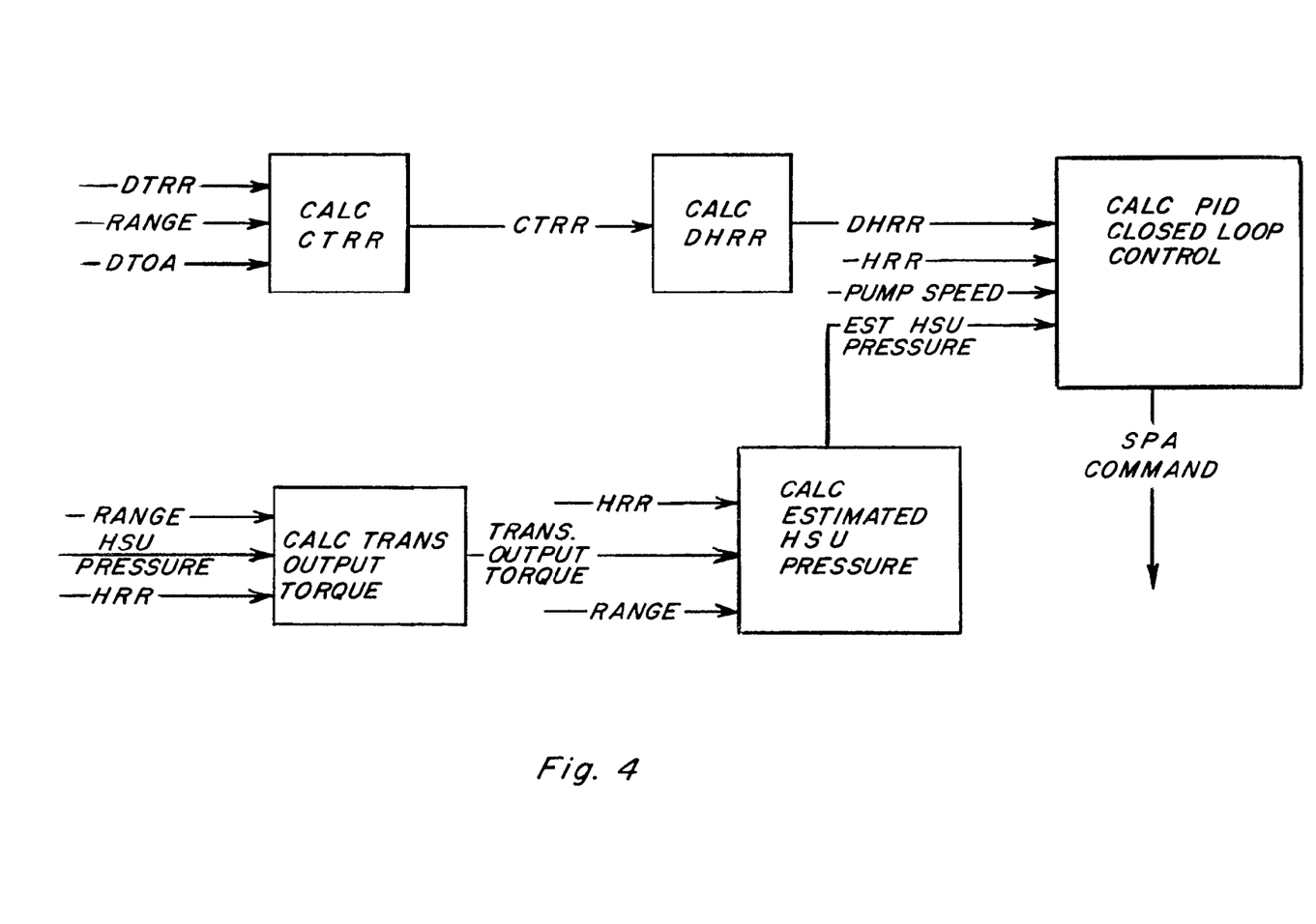
FIG. 4 is a simplified diagrammatic representation of the swash plate control for the hydrostatic power unit of the transmission of FIG. 2.

One of the main functions of controller 100 is to control HRR. A vehicle control logic "VCL" determines desired vehicle actions. The VCL portion of the software handles the user interface. Driveline control logic "DCL" controls operation of controller 100 for executing the desired actions required by transmission 10. Controller 100 calculates the DTRR and DTOA, based on operator inputs and strategy to control engine speed. The controller then achieves this DTRR and DTOA through control of the clutches and HRR. The swash plate directly controls the speed of the vehicle (except during shuttle shifts that slip clutches or when clutch is depressed). The performance of the hydrostatic power unit thus directly impacts the performance of the vehicle. The design of the controls should optimize the performance of the swash plate movement. The swash plate control can be divided into several different areas, illustrated in FIG. 4, and described below. The desired TRR or "DTRR" supplied by the VCL cannot be used to directly control the swash plate since it could result in excessive accelerations. It must be limited by the "Desired Transmission Output Acceleration" supplied by the VCL. The DTRR and DTOA should be viewed as connected, and often the DTOA controls how the vehicle feels.

Controller Transmission Reciprocal Ratio (CTRR)

The DTRR supplied by the VCL cannot be used to directly control the swash plate since it could result in excessive accelerations. It must be limited by the "Desired Transmission Output Acceleration" supplied by the Logic Controller. The DTRR and DTOA should be viewed as connected, and often the DTOA controls how the vehicle feels. This limited version of DTRR is called CTRR (Controller Transmission Reciprocal Ratio).

CTRR must be initialized to zero when the controller turns off the parking brake and enters the first range. CTRR is limited so that it does not go beyond the shift point until the shift completes (since actual TRR may lag CTRR). Note CTRR is also limited when the range is limited due to faults.

The CTRR may also be manipulated during range shifting and shuttle shifting, to avoid poor performance. For example, to prevent shifting back and forth if the DTRR commanded by VCL is near the shift point, hysteresis is added to DTRR before it is used by the DCL in most all instances. The DCL will not achieve the exact DTRR commanded by the VCL near the shift point, but the VCL can still adjust the engine speed to achieve the exact ground speed desired.

As the CTRR approaches the DTRR, the DTOA used for CTRR calculation is reduced to improve the feel and reduce any overshoot. This is also done as the CTRR approaches zero.

During shuttle shifts directional swaps, the CTRR does jump directly to the "Opposite TRR", determined from the DTRR commanded by the VCL (which immediately jumps to the reverse direction to command a shuttle) and parameters that determine how shuttle shifts are performed. DTOA is not used to ramp the CTRR during a directional swap, but is used control vehicle deceleration and reacceleration by modulating the pressures in the clutches or park brake, as explained later in sections on shuttle shifting.

A version of CTRR without DTOA limiting is created so that ultimately it can be used to prevent controller windup by indicating how far CTRR is from the DTRR command, but properly take into account range limiting and such. In HS mode, CTRR is calculated in a similar way, but without any changes for range shifts or shuttles.

Desired Hydrostatic Reciprocal Ratio (DHRR)

From CTRR, the desired ratio across the HSU is calculated (DHRR). The required ratio across the HSU for a given TRR varies depending on the range clutches engaged. This is illustrated in FIG. 3. The HRR needed for a given TRR and range is derived by equations below. This will be termed the "Desired" HRR or DHRR. As the DTRR increases, the HRR increases in the first range, then decreases in the second range. As the shift occurs, the method for determining the DHRR must change.

The SPA will be controlled in a closed loop fashion to achieve the HRR, which will then in turn provide the correct TRR. In this simple way, the correct ratio is controlled. The transmission output speed is not directly needed.

The only common reason that the TRR would not be accurately achieved is if the clutches are slipping. In this case, the SPA will not be adjusted to maintain the speed, since this would simply result in additional clutch slippage and possibly more damage. This should not occur in a correctly functioning transmission, and is monitored as a fault condition.

Only exactly at the shift point is the DHRR the same in two different ranges, for a given TRR. Since shifts cannot always occur exactly at the ideal shift point, and shifts are not instantaneous, a transition is needed from calculating the DHRR from one equation in the off-going range to another in the on-coming range.

The rate of change of DHRR is also controlled, even after the CTRR rate of change control using DTOA. This is done to reduce the rate of change near the shift point to improve the shift quality. Different rate limits are also used when positioning the swash plate before engaging (to avoid overshoot and minimize time to engage) and during shuttle shifts that move the swash plate while driveline is disengaged.

PID Closed Loop Control to Achieve DHRR

Figure 5:
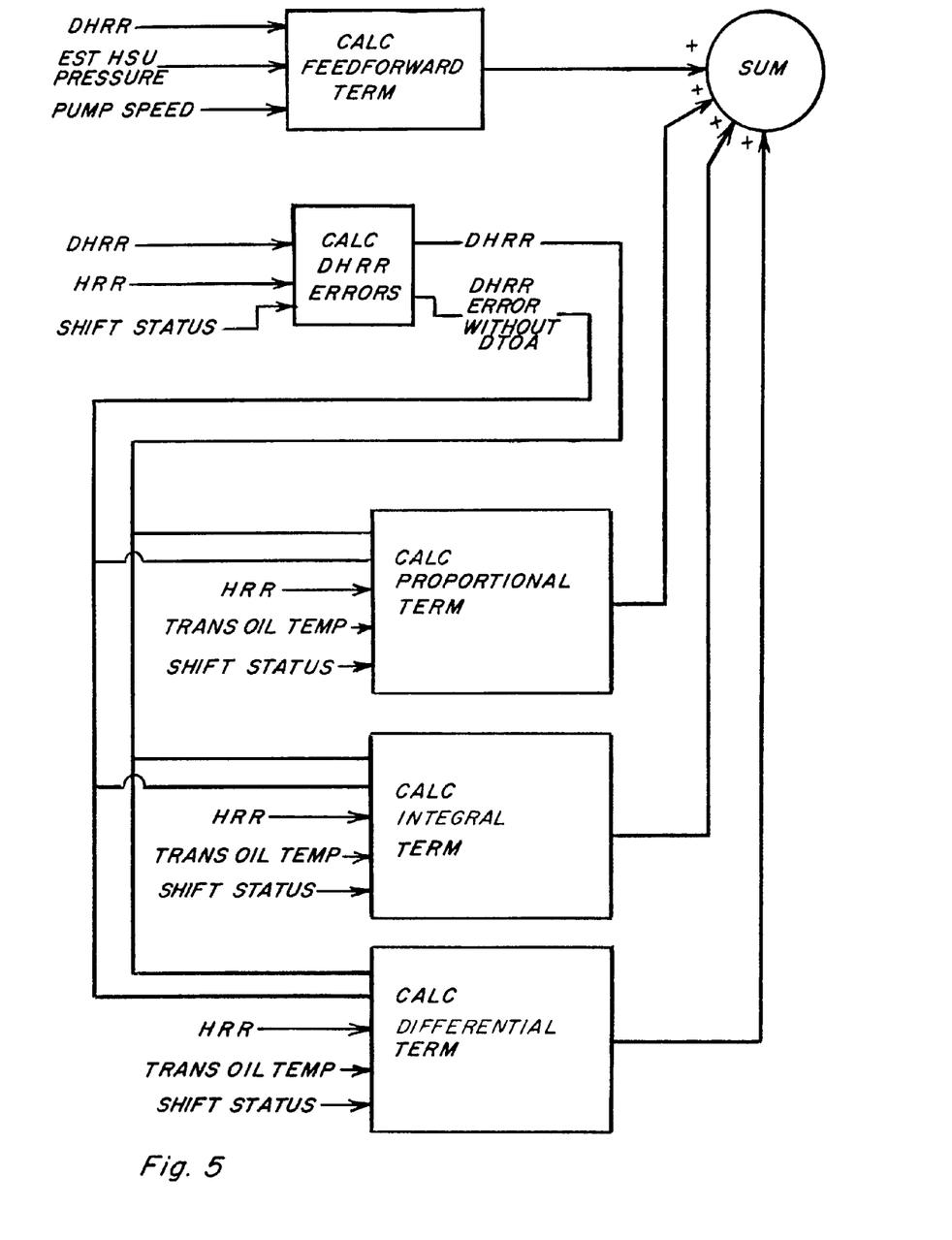
FIG. 5 is a simplified diagrammatic representation of the DHRR PID control for the transmission of FIG. 2.

Referring also to FIG. 5, now that the desired ratio (DHRR) is determined, a closed loop control system is used to achieve the target, by changing the swash plate command. This closed loop control will be active in one form or another through all modes (range shifting, powered zero, hydrostatic, cold start, even shutdown). The same PID control will be used, although the target (DHRR) and gains modifications may be done differently.

The swash plate control uses a common Proportional, Integral and Derivative (PID) approach, but with the gains adjusted according to lookup tables using several other factors. The integral sum is also adjusted during the range shift, to compensate for hysteresis in the HSU.

One important aspect of the closed-loop PID control of the swash plate is the open loop (feedforward) term calculated from the swash plate angle. The feed forward term is calculated from first principles using the equation for relating HRR to SPA below. The volumetric efficiency is calculated using a three dimensional lookup table (three inputs, one output). The volumetric efficiency changes from greater than one to less than one as the power through the HSU changes direction. This is a discontinuity that is compensated for using this feed forward technique.

Rather than using the measured pressure for the feedforward term, a special estimated pressure is constructed. First the driveline torque is calculated, which is explained below. The driveline torque should be relatively constant, especially before and after a shift. During a range shift clutch swap, this driveline torque estimate is held constant and not updated with new pressure values, since the pressure during the range shift clutch swap does not reflect the driveline torque (due to transients). An estimated HSU pressure is calculated for the oncoming range using the driveline torque. This also allows the swash plate to be commanded to the correct position needed after the shift before the shift actually occurs, which is useful to compensate for the delay in moving the swash plate.

The rate of change of the DHRR is also carefully controlled using shift status information, to improve the performance. As the DHRR approaches the shift point, the rate of change is reduced, to allow the TRR to catch up and reduce the error, which reduces the chance of overshoot.

The integral term includes several features aimed at controlling "windup" (excess in the integral sum from long periods of error, leading to overshoot). The primary mechanism used is to cut the integral gain all the way to zero if the error between the DTRR and rate limited CTRR is high (although the actual limit is in terms of HRR). This allows the feedforward term to drive the command until closer to the target.

In conclusion, this approach also allows for fast step response and minimal overshoot needed for engaging and shuttling, which is challenging with the transmission architecture, and also good tracking with little error for smaller movements.

HRR from Displacements and Efficiencies

The speed ratio across the pump (HRR) can be written, $$HRR = \frac{\omega_{motor}}{\omega_{pump}} = \frac{V_{pump}}{V_{motor}} \cdot \eta_{Total\_Vol}(P_{HSU}, SPA, \omega_{pump}) \cdot SPA$$

where $V_{pump}$ and $V_{motor}$ are the volumes of the pump and motor, $\omega_{motor}$ is the speed of the motor, $\omega_{pump}$ is the pump speed, and $\rho_{Total\_Vol}$ is the total volumetric efficiency of the pump and motor that depends on the HSU pressure, Swash Plate Angle (SPA) and the pump speed. The efficiency will be calculated using test data provided by the HSU manufacturer or from testing and recorded, using a three dimensional lookup table (three inputs, one output). The efficiencies are less than one when the pump is functioning as a pump (non-regeneration mode) and greater than one if the pump is functioning as a motor (regeneration mode). This can also be viewed as dividing by the efficiency rather than multiplying by it, but this requires writing another equation.

This equation can be solved for SPA, except that the volumetric efficiency is a function of SPA. The algebraic loop can be resolved by simply using the feedforward SPA term (output of the lookup table) from the last loop.

For non-regeneration mode, indicated by a positive sign ($P_{HSU} \cdot \omega_{motor}$)

$$SPA = \frac{V_{motor}}{\eta_{Total\_Vol}(P_{HSU}, SPA, \omega_{pump}) \cdot V_{pump}} \cdot HRR$$

For regeneration mode, indicated by a negative sign ($P_{HSU} \cdot \omega_{motor}$)

$$SPA = \frac{\eta_{Total\_Vol}(P_{HSU}, SPA, \omega_{pump}) \cdot V_{motor}}{V_{pump}} \cdot HRR$$

Transmission Torque Equations

The torque in the motor in N*m is equal to $$T_{motor} = \frac{P_{HSU} \cdot V_{motor}}{2 \cdot \pi} \cdot \eta_{Motor\_Mech}$$

where the pressure is in Pa (N/m^2) and the motor volume is in m^3. The pressure is positive for non-regenerative mode and negative for re-generation mode. Note that the efficiency term is the mechanical efficiency of the motor alone, not the total for the HSU. If we convert the pressure in bar and motor volume in cubic cm, $$T_{motor} = \frac{P_{HSU} \cdot V_{motor}}{2 \cdot \pi \cdot 10} \cdot \eta_{Motor\_Mech}$$

and again the torque is in N*m.

Motor efficiency will be measured on a test platform, using torque transducers on the axle loads.

The motor efficiency is less than one for non-regeneration mode, indicated by a positive sign($P_{HSU} \cdot \omega_{motor}$), and greater than one for regeneration mode, indicated by a negative sign($P_{HSU} \cdot \omega_{motor}$). Generally the motor efficiency varies with Pressure, SPA and pump speed.

As noted above, driveline torque may also be used to estimate HSU pressure for on-coming range during range shifts. Motor efficiency is determined from a look up table that is a function of pressure.

The torque at the planetary output can be written in terms of the motor torque,

For Range 1 and 3, $$T_{P13} = \frac{T_m \cdot \left(\frac{N_{12}}{N_{10}}\right)}{K_1} \cdot (K_1 - 1)$$

where $$K_1 = -\frac{N_R}{N_{P2}} \cdot \frac{N_{P1}}{N_{S1}}$$

and where $N_{12}$ is the number of teeth of gear N12 and $N_{10}$ is the number of teeth of gear N10. Additionally, $N_R$ is the number of teeth of the ring gear of the planetary; $N_{P1}$ is the number of teeth of each planet gear NP1; $N_{P2}$ is the number of teeth of each planet gear NP2; and $N_{S1}$ is the number of teeth of the primary sun gear NS1.

For Range 2 and 4, $$T_{P24} = \frac{T_m \cdot \left(\frac{N_{12}}{N_{10}}\right)}{\left(\frac{(K_2-1)K_1}{(K_2-K_1)}\right)} \cdot \left[\frac{(K_2-1) \cdot K_1}{(K_2-K_1)} - 1\right]$$

where $$K_2 = \frac{N_{S2}}{N_{P2}} \cdot \frac{N_{P1}}{N_{S1}}$$

and $N_{S2}$ is the number of teeth of the secondary sun gear NS2.

The output torque can now be written in terms of the planetary torque, for each range, For Range 1, $$T_{O1} = \frac{T_P}{\left(\frac{N_{13}}{N_{14}}\right) \cdot \left(\frac{N_{17}}{N_{18}}\right)} \cdot \eta_{plantery}$$

where $N_{13}$ is the number of teeth of the gear N13; $N_{14}$ is the number of teeth of gear N14; $N_{17}$ is the number of teeth of gear N17; $N_{18}$ is the number of teeth of gear N18, and n is the efficiency of the planetary power unit, which can be known or determined through testing.

For Range 2, $$T_{O2} = \frac{T_P}{\left(\frac{N_{15}}{N_{16}}\right) \cdot \left(\frac{N_{17}}{N_{18}}\right)} \cdot \eta_{plantery}$$

where $N_{15}$ is the number of teeth of the gear N15; and $N_{16}$ is the number of teeth of gear N16.

For Range 3, $$T_{O3} = \frac{T_P}{\left(\frac{N_{13}}{N_{20}}\right) \cdot \left(\frac{N_{19}}{N_{22}}\right)} \cdot \eta_{plantery}$$

where $N_{19}$ is the number of teeth of the gear N19; $N_{20}$ is the number of teeth of gear N20; $N_{21}$ is the number of teeth of gear N21; and $N_{22}$ is the number of teeth of gear N22.

For Range 4, $$T_{O4} = \frac{T_P}{\left(\frac{N_{15}}{N_{21}}\right) \cdot \left(\frac{N_{19}}{N_{22}}\right)} \cdot \eta_{plantery}$$

The output torque is then given in terms of the motor torque, for each range by, $$T_{O1} = M_{O1} \cdot M_{P13} \cdot T_m$$

$$T_{O2} = M_{O2} \cdot M_{P24} \cdot T_m$$

$$T_{O3} = M_{O3} \cdot M_{P13} \cdot T_m$$

$$T_{O4} = M_{O4} \cdot M_{P24} \cdot T_m$$

Where $$M_{P13} = \frac{\left(\frac{N_{12}}{N_{10}}\right)}{K_1} \cdot (K_1 - 1)$$

$$M_{P24} = \frac{\left(\frac{N_{12}}{N_{10}}\right)}{\left(\frac{(K_2-1) \cdot K_1}{(K_2-K_1)}\right)} \cdot \left[\frac{(K_2-1) \cdot K_1}{(K_2-K_1)} - 1\right]$$

$$M_{O1} = \frac{1}{\left(\frac{N_{13}}{N_{14}}\right) \cdot \left(\frac{N_{17}}{N_{18}}\right)} \cdot \eta_{plantery}$$

$$M_{O2} = \frac{1}{\left(\frac{N_{15}}{N_{16}}\right) \cdot \left(\frac{N_{17}}{N_{18}}\right)} \cdot \eta_{plantery}$$

$$M_{O3} = \frac{1}{\left(\frac{N_{13}}{N_{20}}\right) \cdot \left(\frac{N_{19}}{N_{22}}\right)} \cdot \eta_{plantery}$$

$$M_{O4} = \frac{1}{\left(\frac{N_{15}}{N_{21}}\right) \cdot \left(\frac{N_{19}}{N_{22}}\right)} \cdot \eta_{plantery}$$

The output torque is related to the drawbar force (or traction force), $$F_{drawbar} = T_O \cdot \text{Ratio}_{Final\_Drive}/\text{Tire\_Radius}$$

The torque at each clutch can be related to the output torque of the transmission, $$T_{C1C2} = T_O \cdot \left(\frac{N_{17}}{N_{18}}\right)$$

$$T_{C3C4} = T_O \cdot \left(\frac{N_{19}}{N_{22}}\right)$$

It will be understood that the foregoing descriptions are for preferred embodiments of this invention and that the invention is not limited to the specific forms shown. Other modifications may be made in the design and arrangement of other elements without departing from the scope of the invention as expressed in the appended claims.

What is claimed is:

1. A method for automatically controlling an angle of a swash plate of a hydrostatic power unit of a continuously variable hydro-mechanical transmission, the method comprising:
   determining, with a processor-based controller, a desired hydrostatic reciprocal ratio of the hydrostatic drive unit based on a desired transmission reciprocal ratio for the transmission;
   determining, with the processor-based controller, a feedforward control term based on the desired hydrostatic reciprocal ratio of the hydrostatic power unit, a pump speed for the hydrostatic power unit, and a pressure for the hydrostatic power unit;
   determining, with the processor-based controller, a closed-loop control term based on an error calculated as a function of the desired hydrostatic reciprocal ratio;
   calculating, with the processor-based controller, a swash plate command based on the feedforward control term and the closed-loop control term; and
   transmitting, with the processor-based controller, the swash plate command for adjusting the angle of the swash plate.

2. The method of claim 1, wherein the pressure corresponds to an estimated pressure for the hydrostatic power unit, the estimated pressure being determined as a function of at least a calculated driveline torque for the transmission, and the pump speed.

3. The method of claim 1, wherein the close-loop control term is determined by the processor-based controller implementing a PID control loop.

4. The method of claim 1, wherein the desired hydrostatic reciprocal ratio is defined as a motor speed for the hydrostatic power unit divided by the pump speed.

5. A method for automatically controlling an angle of a swash plate of a hydrostatic power unit of a continuously variable hydro-mechanical transmission, the method comprising:
   determining, with a processor-based controller, a desired hydrostatic reciprocal ratio of the hydrostatic drive unit based on a desired transmission reciprocal ratio for the transmission;
   determining, with the processor-based controller, a feedforward control term based on the desired hydrostatic reciprocal ratio and an estimated pressure for the hydrostatic power unit;
   determining, with the processor-based controller, a closed-loop control term based on an error calculated as a function of the desired hydrostatic reciprocal ratio;
   calculating, with the processor-based controller, a swash plate command based on the feedforward control term and the closed-loop control term; and
   transmitting, with the processor-based controller, the swash plate command for adjusting the angle of the swash plate.

6. The method of claim 5, wherein the feedforward term is additionally determined as a function of a pump speed for the hydrostatic power unit.

7. The method of claim 5, wherein the estimated pressure of the hydrostatic power unit is determined as a function of at least a calculated driveline torque value for the transmission, and a pump speed for the hydrostatic power unit.

8. The method of claim 5, wherein the desired hydrostatic reciprocal ratio is defined as a motor speed for the hydrostatic power unit divided by a pump speed for the hydrostatic power unit.

* * * * *